United States Patent [19]
Randall

[11] 3,742,761
[45] July 3, 1973

[54] THERMAL FLOWMETER
[75] Inventor: Richard L. Randall, Van Nuys, Calif.
[73] Assignee: North American Rockwell Corporation, Canoga Park, Calif.
[22] Filed: July 29, 1971
[21] Appl. No.: 167,396

[52] U.S. Cl. .................................................. 73/204
[51] Int. Cl. .......................... G01f 1/00, G01p 5/10
[58] Field of Search .................................... 73/204

[56] References Cited
UNITED STATES PATENTS

| | | | |
|---|---|---|---|
| 3,147,618 | 9/1964 | Benson | 73/204 |
| 2,745,283 | 5/1956 | Hastings | 73/204 |
| 3,592,061 | 7/1971 | Schwedland | 73/343 |
| 3,336,804 | 8/1967 | Poppendiek et al. | 73/204 |
| 3,187,569 | 6/1965 | Los | 73/204 X |
| 3,592,058 | 6/1971 | Bensen et al. | 73/204 |

Primary Examiner—Herbert Goldstein
Attorney—L. Lee Humphries, Robert G. Upton et al.

[57] ABSTRACT

A flowmeter for determining the rate of flow of a fluid through a conduit including a thermocouple immersed in the fluid, means for heating the thermocouple to a temperature above the temperature of the flowing fluid and means for recording the thermocouple voltage. The thermocouple is typically helically shaped with the thermocouple junction at the downstream end of the helix. The thermocouple voltage can be related to the rate of flow of the fluid through the conduit.

6 Claims, 3 Drawing Figures

FLOWRATE VS. MEASURED THERMOCOUPLE OVERTEMPERATURE
IN SODIUM AT 1200°F (ΔT°F)

INVENTOR.
RICHARD L. RANDALL

BY Robert G. Upton

AGENT

THERMAL FLOWMETER

The invention described herein was made in the course of, or under a contract with the U. S. Atomic Energy Commission.

BACKGROUND OF THE INVENTION

1. Field of the Invention

This invention is in the field of flowmeters for determining the rate of flow of a fluid and particularly for determining the rate of flow of a fluid in a nuclear reactor.

Sensing devices for monitoring the flow rate of liquids within a nuclear reactor are a necessity; however, difficult problems arise in selecting the proper flowmeters. Accordingly, a need exists for a sensor that can provide change of flow and "loss of flow" information prior to or during nuclear reactor operation. Moreover, instrumentation is needed to detect "voids" in reactor flow. The "voids" create an instantaneous, extremely high heat zone that can be dangerous to the operation of the nuclear reactor core.

2. Description of the Prior Art

The prior art discloses, for the most part, variations of hot-wire anemometer or thermocouple techniques or combinations thereof. These sensors are responsive to variations in those properties of the surrounding fluid which affect the rate of heat exchange between the fluid and the sensor.

U. S. Pat. No. 3,449,953 discloses a constant temperature hot-wire anemometer which has its hot-wire connected to the output circuit of a low gain amplifier. A fraction of the output signal is supplied via a positive loop to the input of the amplifier, the magnitude of the fraction depending on the electrical resistance and hence on the temperature of the hot-wire. The current required to maintain the hot wire at a temperature such that the loop gain is exactly unity is used as a measure of the cooling effect of fluid flowing past the hot wire and hence as an indication of the flow rate of the fluid.

U. S. Pat. No. 3,030,806 utilizes the thermocouple principles to measure fluid flow through a conduit. The invention contemplates measurement of physical variables such as fluid flow by utilizing the temperature difference effects manifested in Seebeck-Peltier thermocouple junctions. The junction responds to a change in physical conditions such as fluid flow. The device senses the heat transfer effects of a flowing fluid medium past the thermocouple junction to provide an output signal representing the rate of fluid flow. The apparatus, however, does not operate by heating the thermocouple above the temperature of the fluid to monitor the rate of flow of the fluids.

U. S. Pat. No. 2,314,877 discloses an anemometer that utilizes thermocouple principles. A wire is maintained at a constant temperature, which temperature is sensed by a separate thermocouple circuit. Adjustable slots in a pair of concentric cylinders surrounding the thermocouple junction are rotated, thus admitting more or less air through the anemometer. To establish a "null" position wherein the thermocouple reads zero, the housing, consisting of the concentric cylinders, is adjusted to completely shield or shut off the outside air to the thermocouple. The slots in the concentric cylinders are then opened up and the flowing air dissipates the heat from the heated wire and gives a thermocouple reading which is related to the velocity of the air passing by the heated wire.

Hence, there is a need, particularly in the nuclear art, for a flowmeter which will monitor a change in the flow rate of a fluid flowing past a thermocouple junction. Particularly in the nuclear field, there is an additional need for a sensing device which will instantaneously sense a "loss of flow" and that will indicate bubbles or "voids" in a stream of flowing liquid which would indicate a potentially serious problem within a nuclear reactor core.

SUMMARY OF THE INVENTION

I have invented a flowmeter which utilizes a single grounded thermocouple junction with only two lead wires, the probe being capable of simultaneously heating the reactor coolant entering the shroud tube during reactor startup and monitoring the overtemperature of the fluid and thus measuring the flowrate of the coolant through the system by maintaining an overtemperature of the flowmeter above the temperature of the fluids flowing thereby. Variations in overtemperature are proportional to flowrate. The basic approach involves a technique for using one thermocouple to heat as well as to monitor the flow rate of, for example, liquid metals or fluids, the sensor being additionally used as a "loss of flow" detector.

Accordingly, it is an object of this invention to provide a thermocouple flowmeter to monitor the flowrates of a flowing fluid.

More specifically, it is an object of this invention to provide a thermocouple heater that monitors the flow rate of liquid metals in the reactor core during operation, as well as detecting a "loss of flow" of the liquid passing by the thermocouple sensor so as to detect a problem within the core of a nuclear reactor.

The thermocouple basically consists of an outer sheath of thin thermocouple mill stock having a pair of thermocouple wires therein. The sheathed thermocouple material is wound in a coil pattern. The coil is then inserted within a hollow shroud or conduit, the shroud having a concentric outer cylinder to inhibit heat transfer between the inner and outer concentric tubes. The inner thermocouple wires are metallurgically bonded to the surrounding sheath or tube so that the wires and sheath are in electrical contact. The thermocouple junction is at one end of the coil. The completed thermocouple is then heated to a specific temperature above the temperature of the fluid by a constant AC current. Liquid is passed out the end of the coil opposite the thermocouple junction so that fluid passes over the coils and within the surrounding shroud, subsequently passing out of the device beyond the thermocouple junction.

An AC power source is applied in-phase coupled to a bridge circuit to the two joined thermocouples as a source of power to heat the thermocouples above the temperature of the fluid. The high or "floating side" of the AC modulated current is connected to the thermocouple wires while the "low side" of the AC power source is connected to the grounded thermocouple sheath surrounding the wires. The thermocouple is driven by a pair of tantalum capacitors which are attached to each side of the thermocouple, the capacitor serving to balance the current supplied to each wire to equally heat each wire to a uniform temperature above the temperature of the fluid. Thus, the AC power source heats up the wires and surrounding sheath so as to transfer heat to the flowing liquid passing over the coiled thermocouple. The outer concentric shield serves to inhibit heat transfer to the liquid passing outside of the flowmeter apparatus.

The thermocouple operates on the principle of a thermal flowmeter, i.e., the power required to raise the temperature of a flowing fluid or liquid a given amount is proportional to the velocity of the fluid. Thus, if the thermocouple is heated to a given temperature, the $\Delta T$ of the flowing liquid over the coils and within the outer thermocouple shroud is monitored through the thermocouple junction at the downstream end of the coil. Since the circuit is balanced through a Wheatstone bridge, any variance in flow rate through the device will immediately be detected by the thermocouple junction. Temperature of the fluid passing by the coil will either rise due to a slowdown of fluid flow, or it will drop due to an increase of flow, thereby indicating rate of flow. If a "void" or bubble should occur in the flowstream passing through the device, an immediate rise in temperature of the coil will instantaneously detect this adverse condition.

Therefore, an advantage over the prior art is the very small size of the apparatus. Another advantage is the negligible pressure drop caused by the coils within the thermocouple shroud. Still another advantage is the lack of magnetic materials that is normally associated with some sensing devices. Yet another advantage is the minimal power requirements (5 to 50 watts) depending on the required resolution, response time, and flow conditions encountered. Yet another advantage is the simplicity of the device, the apparatus not requiring a multiplicity of components to function.

The above noted objects and advantages of the present invention will be more fully understood upon a study of the following detailed description in conjunction with the detailed drawings in which:

DESCRIPTION OF THE PREFERRED EMBODIMENTS

Figure 1:
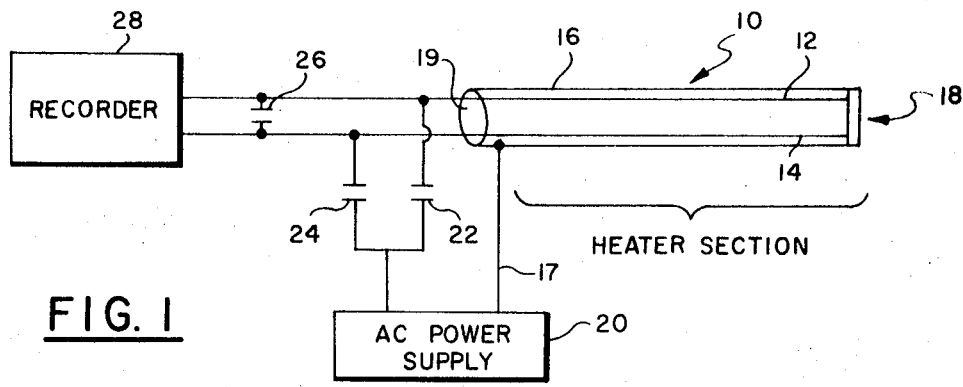
FIG. 1 is a schematic diagram of a thermocouple flowmeter of the present invention.

Referring to FIG. 1, the flowmeter generally designated as 10, consists of a pair of thermocouple wires 12 and 14 contained within a thermocouple sheath 16, the two ends of the wires 12 and 14 having their junction 18 at one end of the thermocouple, the junction being metallurgically bonded to the thermocouple sheath 16. An AC power supply 20 supplies power to each of the thermocouple lead wires 12 and 14 through a pair of tantalum capacitors 22 and 24 in each leg of the AC bridge circuit. The high side of the AC power is applied in-phase through the tantalum capacitors to the two thermocouple wires 12–14 while the low side of the AC power source is supplied to the grounded thermocouple sheath 16, the ground being the lead wire 17 leading into the AC power supply source generally designated as 20 thus completing the circuit. The two thermocouple wires come out of the sheath thermocouple housing through opening 19 and are directed into a recorder 28. A capacitor 26 is connected across the two thermocouple wires at the input of the recorder amplifier to help reduce the effects of residual carrier imbalance created by the operation of the heater and flowmeter 10.

One of the thermocouple wires, for example, 12, may be fabricated from, for example, Alumel alloy, (about 94 percent nickel, with small, carefully controlled amounts of silicon, aluminum and manganese) while the other wire 14 is fabricated from Chromel alloy (approximately 90 percent nickel and 10 percent chromium, with carefully controlled minor ingredients). The Chromel-Alumel lead wires are commonly utilized in the thermocouple art, especially in high temperature environments. The two lead wires 12 and 14 are grounded to the outer cylinder sheath 16 and are supplied by, for example, an AC power source. The entire thermocouple acts as a heater when power is supplied to it. In order to balance (the function of a typical bridge circuit) the thermocouple junction 18, the tantalum capacitor 22 connected to the Chromel lead 14 is, for example, a 30 microfarad capacitor. The tantalum capacitor 24 connected to the Alumel lead 12 is, for example, 2½ times the 30 microfarad capacitor connected to the Chromel lead, or 75 microfarads. The capacitor 26 across the thermocouple wires at the input of the recorder 28 is, for example, a 300 to 400 microfarad capacitor, which is sufficient to reduce the effects of any residual carrier imbalance in the circuit.

It would be obvious to heat up the pair of thermocouple wires without the thermocouple sheath 16 thereover. However, the wires would be more vulnerable to destruction by the power inputs required to heat them.

It has been found through experimentation that, when the stated values of two capacitors in the AC circuit are utilized, the thermocouple is balanced at its junction 18 and the entire thermocouple 10 works as a heater as well as a flowmeter.

By connecting the two thermocouple wires to the grounded sheath, the entire thermocouple serves as a heater when the AC power source is supplied to the thermocouple. Thus it can be seen that the thermocouple apparatus can be heated up and used as a heater to heat, for example, fluid passing thereby.

The input amplifier in the recorder (not shown) must be capable of handling common mode voltage levels of 5 to 50 volts, depending on the thermocouple wire resistance and required power levels for a given application.

Figure 2:
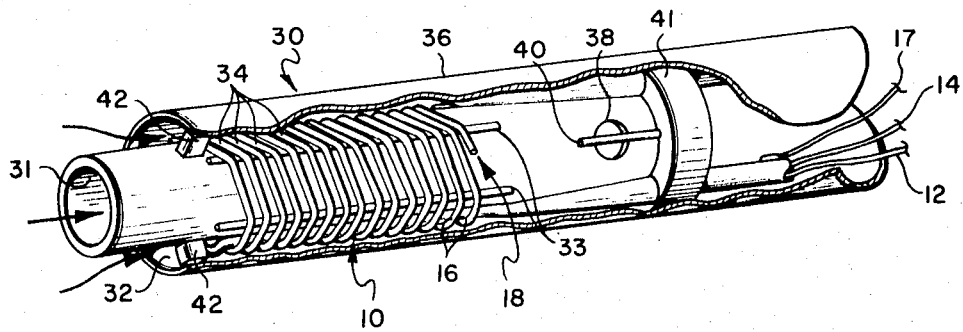
FIG. 2 is a perspective view of the apparatus of the preferred embodiment of the flowmeter partially cut away, illustrating the coil within the thermocouple shroud and the exterior concentric heat barrier tube surrounding the entire apparatus.

Turning now to the perspective of FIG. 2, the heater flowmeter generally designated as 30 consists of an inner conduit 32 which directs the bulk of the fluid by the flowmeter; however, some of the fluid passes into the space 29 defined by the outer wall of conduit 32 and the inner wall of conduit 36 which directs the fluid through the flowmeter. Connected to the inner conduit 32 is the sheathed thermocouple 10 which is wound in a coil around the inner tube 32, terminating downstream from the open end 31 of tube 32. A series of equidistantly spaced spacer rods 33, axially aligned on the conduit 32, serve to space the sheathed thermocouple from the outer surface of the inner conduit.

A series of apertures 38 are equidistantly spaced around and through the tube 32 downstream of flowmeter 30. An outer tube 36 concentrically surrounds the flowmeter and is spaced from the flowmeter by ring 41 which serves as a spacer and as a means to block the fluid passing between the outer sleeve 36 and the inner tube 32. A series of spacer pads or blocks 42 are spaced 120° apart upstream of the flowmeter 30 near opening 31.

There may be more than one coiled thermocouple wrapped about inner tube 32. All of the thermocouples have junctions downstream of the coiled thermocouple. The two lead wires 12 and 14 within sheath 16 continue on through the larger tube 44, as illustrated in the partial cutaway of the perspective drawing. The two wires eventually tie into the AC power source previously described. The grounded lead wire 17, grounded to sheath 16 is similarly directed out of the heater flowmeter 30. The thermocouple junction is bonded at end 18 to the sheath 16 by using, for example, a brazing material such as Nicrobraze 50 manufactured by Wall Colmonoy Corporation that bonds at approximately 2150°F.

In operation, most of the liquid enters the interior of the inner tube 32. However, some of the liquid is directed between the space 29 defined by the exterior wall of the tube 32 and the inner wall of the outer tube 36 as heretofore described. Liquid passing over the coils is monitored and enters the interior of tube 32 through orifices 38, equidistantly spaced about and through the tube 32. The liquid eventually joins the main flow of liquid flowing through the interior of tube 32. Additional thermocouples 40 may be positioned adjacent holes 38 to detect the temperature of the liquid just prior to its entering the interior of tube 32. This would provide an additional ΔT readout of the fluid passing by the coils prior to entering the tube 32. The heated flowmeter has a constant source of AC power supplied to it thereby maintaining a temperature above the temperature of the fluid thus monitoring the liquid passing thereby. As previously described, if the liquid flow slows down, the temperature rises and this rise in temperature is detected at the junction 18 and subsequently recorded on recorder 28. Conversely, an increase of flow past the flowmeter 30 would cause the heater to cool down and this condition is monitored at the downstream junction 18. Thus, the difference in temperature will give an indication of the flow rates. The additional thermocouples 40 supply supplementary parametric information to the main flowmeter 30.

Figure 3:
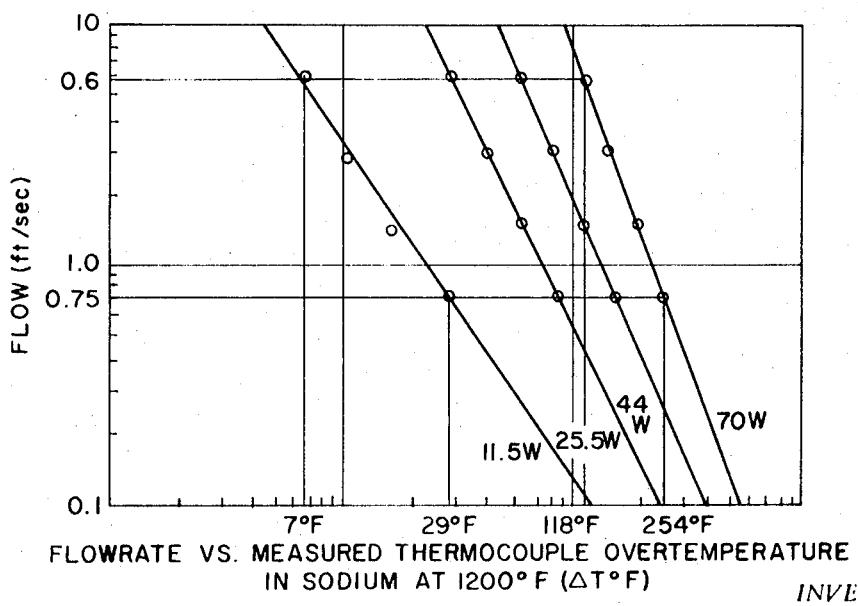
FIG. 3 is a chart demonstrating the characteristics of the flowmeter when the flow rates and power settings are varied.

The chart shown in FIG. 3 was derived from tests of the flowmeter in liquid sodium at 1200°F. Utilizing a reference flowmeter, tests were run at 6, 3, 1.5 and 0.75 ft./sec. at various power levels ranging from 10 to 70 watts. More particularly, the test points were at 11.5 watts, 25.5 watts, 44 watts and 70 watts. The results, seen on the chart, are in the form of flow versus overtemperature for each of the four power levels reached, the results being essentially straight lines on a log-log scale which indicated a simple exponential relation between flow and overtemperature. Utilizing the foregoing example, over the range from 6 to 0.75 ft./sec., observed overtemperatures [the difference in temperature between the heated and unheated (i.e., 1200°F) sodium] ranged from 7°F to 29°F at 11.5 watts; 30°F to 37°F at 25.5 watts; 58°F to 156°F at 44 watts and 118°F to 254°F at 70 watts. Some of these points are specifically indicated on the chart.

As heretofore described, tantalum capacitors were used in the foregoing tests. The observed offset of about 0.3 millivolts was due to a temporary polarizing effect of the capacitors used in the test. Non-polarized capacitors could be used in future efforts. These tests indicated that the flowmeter device 30 would be applicable to both temperature and flow measurement in liquid sodium as well as other fluids at comparable temperatures and flow conditions anticipated, for example, in a nuclear reactor.

The exponential relationship between flow and overtemperature implies that a conventional solid state DC amplifier with a log converter module could be used to provide a direct readout of flow rate on a log scale. The measurement position of such a system would tend to be a constant percent of indicated flow rate. The effective sensitivity increases as flow decreases, thus the system is particularly suited to indicating a "loss of flow" or "low flow" condition which is desirable in the nuclear reactor field to instantaneously detect this adverse condition.

I claim:

1. A flowmeter to monitor a stream of fluid comprising:
   a conduit for directing a portion of said flowing fluid by the flowmeter,
   a pair of thermocouple wires surrounded by a thermocouple sheath, having a thermocouple junction at one end of said wires, said sheath being connected to said wires at said thermocouple junction, said thermocouple wires and surrounding sheath being grounded to each other along a length extending spirally around the outer periphery of said conduit and extending lengthwise thereof within said stream of fluid, the thermocouple junction being positioned at the downstream end of said wires;
   means connected to said thermocouple wires and sheath to heat said spirally extending wires and sheath to a temperature above the temperature of said stream of fluid passing thereover; and
   means to measure the output of said thermocouple junction, the change of output of said thermocouple junction defining a change of flow rate of the stream passing through said flowmeter.

2. The flowmeter of claim 1 wherein said means to heat the thermocouple wires is AC electricity wherein the high side of said AC current is connected in phase to each of said thermocouple wires and the low side of said AC current is connected to the sheath, said sheath being grounded to said AC power source thereby completing the circuit.

3. The flowmeter of claim 2 further comprising a pair of capacitors positioned between each of said in-phase AC current to each of said thermocouple wires, said capacitors serving to electrically balance each side of said thermocouple wires leading to said thermocouple junction.

4. The flowmeter of claim 1 further comprising an outer concentric conduit spaced from and surrounding said first-mentioned conduit and said spirally extending sheath and wires, said outer conduit serving to inhibit heat transfer to fluid surrounding said flowmeter.

5. The flowmeter of claim 1 wherein said stream of fluid is liquid sodium.

6. The flowmeter of claim 1 further comprising spacer rods axially extending along the outer surface of said conduit between said conduit and said spirally extending thermocouple wires and sheath, said spacer rods spacing said wires and sheath from the outer surface of said conduit.

* * * * *